(No Model.)
T. WEAVER.
WEATHER STRIP.
No. 311,929. Patented Feb. 10, 1885.
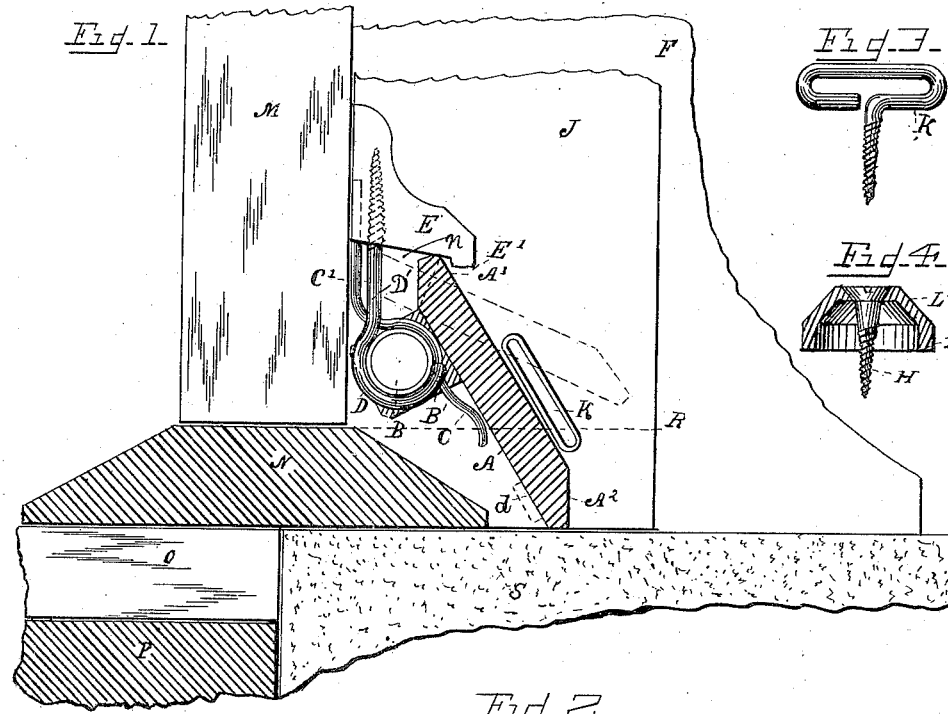
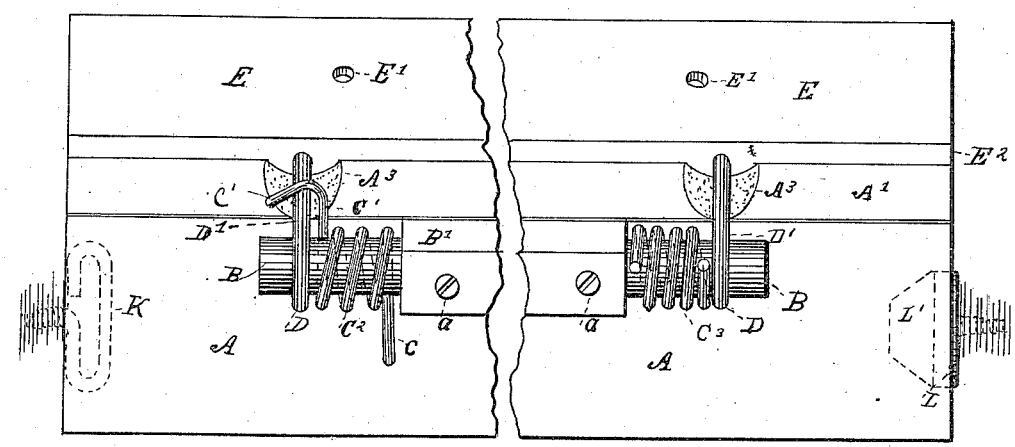
Witnesses:
G. A. Tauberschmidt
B. B. Hamlin Jr
Inventor:
Theophilus Weaver.

UNITED STATES PATENT OFFICE.

THEOPHILUS WEAVER, OF HARRISBURG, PENNSYLVANIA.

WEATHER-STRIP.

SPECIFICATION forming part of Letters Patent No. 311,929, dated February 10, 1885.

Application filed November 13, 1884. (No model.)

*To all whom it may concern:*

Be it known that I, THEOPHILUS WEAVER, a citizen of the United States, residing at Harrisburg, in the county of Dauphin and State of Pennsylvania, have invented certain new and useful Improvements in Weather-Strips for Doors; and I do hereby declare that the following is a full, clear, and exact description of the invention in connection with the accompanying drawings.

Its novel and useful features are, first, a weather-strip having its attaching-cap provided with hinging screw-hooks, in combination with a stiff flap secured to a rotary axle or bar provided with journals supported in said screw-hooks parallel to and vertically below rear part of said cap, and having the flap's head aligned close to under side of the same, and limited as to its throw by a front lip on said cap and by the shanks of said screw-hooks projected from its rear part; second, a self-adjusting weather-strip composed of attaching-cap having two screw-hooks attached to its rear part, of axle provided with journals and supported in said hooks, of one or two torsional spiral springs applied to said axle interior to said hooks, and of flap secured firmly to said axle, and having its head stopped as to its movements by said protecting-cap and by said screw-hooks, all coupled as a complete article, and extended beneath it directly in front of bottom rail of door as bearings for the journals of the axle of the flap, and an actuating spiral spring applied to said axle to throw the flap's foot automatically above the carpet-strip; third, in combination with said cap, screw-hooks, flap, axle, and actuating-spring, a spring-washer applied to said axle, between one of its bearings and a shoulder thereon, to give easement to the flap longitudinally; fourth, in combination with said devices, certain stops on door-jambs.

In the accompanying drawings, Figure 1 represents an end view of my weather-strip mounted on door, with stop on jamb. Fig. 2 represents a rear side elevation of my weather-strip with flap in position as when door is closed and it turned down at foot both by elongated screw-eye and conical stop at opposite jambs. Figs. 3 and 4 are perspective views of my elongated screw-eye stop and my conical stop, respectively.

In the description similar references denote similar parts and portions.

Letter M denotes a door; N, the carpet-strip thereunder; O, the floor of room; S, the sill or threshold; F, a door-jamb; J, the rabbet-strip thereon, and K the adjustable stop for weather-strip on rabbet-strip or jamb F on lock side of door.

Letter A denotes the flap or weather-strip proper, of nearly rhomboidal cross-section, having head or top A' beveled on rear side, and foot $A^2$ beveled on front side, as shown. It is preferably of walnut or ash wood, but may be faced with metal in front. It is firmly attached to and swung by the axle-bar B B B', as shown, by screws $a$, or their equivalents, and is extended to step with its foot $A^2$ on the sill S, exterior to carpet-strip N. The body or board A is extended obliquely upward toward the door M, and its top or head A' is sheltered under and behind the rabbeted molding or cap E, provided with lip or stop E', which latter, with said head A', forms a weather-proof joint, not liable to clog with ice, and adapted to exclude cold, dust, rain, and snow. Said lip E' limits the forward throw of the head A', and the shanks D' D' limit its throw rearward. Cuts $A^3$ $A^3$ in the bevel or rear edge of said head increase said throw to increase the lift of foot $A^2$; but said cuts should be shallow, as indicated in Fig. 1, lest openings be caused thereby at lip E'. Said shanks D' D' are parts of screw-hooks inserted into said molding E in nearly a vertical direction when on door, and to come close against the door at rear portions of the hooks D D thereof, which latter serve as open bearings for the journals B B of the axle of the strip. Said hooks are so situated against the door that they may be strong to resist the strain when the flap A is incautiously tramped on, and also to firmly hold the flap when being tripped down at stop on door-jamb. Said screw-hooks are a well-known hardware article slightly modified, and are set in from the ends of the molding E, leaving the ends of the weather-strip open and unobstructed. The axle B B B' is preferably angular at middle, with lower and rear corner a little taken off to project down and toward door no farther than the semicircles of the hooks D D do. Said axle has at its ends the journals B B, adapted to fit said hooks loosely. The surplus space on one of the journals B between the hook D and the square shoulder at end of journal is filled by a spiral spring, $C^2$, having its end C' caught or fastened in any suitable manner to be out of the path of the head A' of flap when thrown back. I prefer to extend said end up behind the molding E, that it may be pinched between it and the door when attached thereto, as shown in Fig. 1. Said end C' may be fastened to the shank D', as shown in Fig. 2. The end C of spring is applied in sprung condition to bear against the flap below its axis to raise its foot $A^2$ and keep it raised above the indicated line R when door is opened. Around the opposite journal is applied the spiral washer $C^3$, or its equivalent, in position, as shown, to permit the flap to move endwise to a limited extent when forced at either end by contact with jambs in opening and closing door, the spring $C^2$ co-operating with it. The spring-washer may, however, be omitted when the flap is a little fore-shortened.

The parts of my weather-strip are connected together as follows: The molding E, of ample length, is first provided with the screw-hooks D D', D D', set in from its ends a few inches, as shown. The axle-bar B', square-shouldered at the journals B B on its ends, and provided with spring $C^2$, or with both spring $C^2$ and spring-washer $C^3$, is next inserted in the hooks D D, whose points stand frontward. The flap A is next slid to place between the molding E and the axle-bar, with end C of spring $C^2$ sprung against its rear side, and the head A' nearly in contact with rabbeted part $n$. The axle-bar B B B' is next attached firmly to said flap, as by wood-screws $a$, aligning the head A' of flap barely clear of the under part, $n$, of the molding, and allowing it to freely swing from its front position against the lip E', as shown in Fig. 1, to the position indicated, by the action of the spring $C^2$ alone, that it may be a self-righting device, to pass over the carpet-strip without dragging on it, and that it may keep raised above the floor-level when door is open. The said axle-bar is preferably made of hard dry wood, that it may brace the flap against warping. The said parts being connected as stated, the axle is not liable to leave its bearings, nor is the head A' liable to pass the lip or stop E' in its throw, as the hooks stand quite against the door when the molding is secured thereon, and hence cannot spring out of alignment with said lip. This method of connecting the flap with the molding by a walking or rolling hinge closes the crevice between them to exclude rain, and leaves the parts free at their meeting line of interference from snow and ice, as the head A' moves back and downward at the same time, and avoids friction, even if particles of ice should adhere thereto.

For tripping and holding down the part $A^2$ when door is closed, I employ on its jamb, at lock side of doorway, the screw-eye K, made with extensive cross-head and eye, as shown, to be unobstructive, and that it may be adjusted to vary its contact with the part $A^2$ by screwing it to bring its head more or less athwart said foot. On the hinge side of door-frame I use my conical tipped stop L L', adapted to parry and deflect that end of flap by endwise contact, as on worn sills and folding doors. The conical part of said stop serves to bring the flap down by endwise engagement under the cylindrical portion, which latter is short, that the flap shall not impinge against it until it has swept over the carpet-strip N, as when door is closing. Said flap's end sheers toward said stop, and it must be parried downward a moment before the flap's end at lock side of door has crossed the carpet-strip, the conical part of stop thus serving to spring the flap. The said stop therefore serves as a strike or guide, as well as a downward curb. It is preferably made circular at base, and the hole in it for attaching is made a little eccentric, (not shown,) that the stop may be turned about said screw to adjust it to bring the flap snugly down onto the door-sill without binding the parts, said screw being then firmly driven home to keep the stop in regulated position.

I am aware that spring $C^2$ and spring-washer $C^3$ may both be omitted in my device if a guard be employed to keep the flap from the floor on opening the door. The spring $C^2$ acts by the spiral part thereof, as the washer $C^3$ does, to afford endwise easement to the flap A; but the former also acts by torsion, the tangs or ends thereof being extended and applied in sprung condition to throw the flap on its journals B B. In latter office the washer does not assist. When the weather-strip is put upon the market, two torsional springs, $C^2$, are then on its axle or journals, which adapt it well for a heavy door. If, then, a door chances to be light or springy, to reduce the torsional energy sufficiently to enable the flap to be tripped without springing door or warping it by the stop, one of said springs is reduced to a washer, $C^3$, by simply nipping off its tangs.

I do not broadly claim inclined stops or cams on door-frame, as such are not new; nor do I claim a cylindrical anti-friction wheel, as such has been used on lock side of frame; but I am not aware that a transversely-elongated screw-eye was ever used on lock side, nor a bevel-tipped cylindrical stop on the hinge side, of door-frame before mine.

I claim—

1. A weather-strip having the attaching-cap E provided with hanging screw-hooks D D', D D', in combination with the flap A, secured firmly to a bar provided with the journals B B, and thereby supported in said screw-hooks, the flap's head A' aligned close to under side of said cap, and its throw limited by the lip E' on front of cap and by the screw-shanks D' D', projected from its rear part, substantially as and for the purposes set forth.

2. The self-adjusting weather-strip set forth, composed of the attaching-cap, two hinging screw-hooks attached thereto, the axle or bar having its ends adapted as journals and placed in said hooks, one or two torsional springs applied to said journals interior to said hooks, and the flaps secured firmly to said bar and having its throw limited by said cap and the shanks of said screw-hooks, all coupled for operation substantially as shown and described.

3. In a weather-strip for doors, the attaching-cap E, having lip E' at front of rabbeted part $n$, and provided with screw-hooks D D', D D', inserted into its rear portion, in combination with the flap A, firmly attached to its rotary axle B B B', and thereby journaled in said hooks as bearings, and thereby kept in place by head A' of flap being confined under said cap, the actuating-spring $C^2$, and the spring-washer $C^3$, all connected and adapted for operation substantially as set forth.

4. In a weather-strip for doors, the combination of cap E E', the screw-hooks D D', D D', the axle-bar B B B', the flap A, the actuating-spring $C^2$, door M, and stop or stops on door-frame, all co-operating substantially as set forth.

5. In combination with a self-raising weather-strip, A, connectedly arranged with its actuating mechanism on a door, M, the stop L L' on jamb next hinge of door, adapted as a lateral guide, and regulated fixed stops for the flap, substantially as and for the purposes set forth.

THEOPHILUS WEAVER.

Witnesses:
D. C. MAURER,
J. M. WEAVER.